(12) United States Patent
Raines

(10) Patent No.: US 6,974,007 B2
(45) Date of Patent: Dec. 13, 2005

(54) MOTORCYCLE SADDLEBAG PROTECTION APPARATUS AND METHOD

(76) Inventor: Walter L. Raines, 12206 Laneview, Houston, TX (US) 77070

( * ) Notice: Subject to any disclaimer, the term of this patent is extended or adjusted under 35 U.S.C. 154(b) by 0 days.

(21) Appl. No.: 10/352,712

(22) Filed: Jan. 28, 2003

(65) Prior Publication Data

US 2004/0144461 A1 Jul. 29, 2004

(51) Int. Cl.[7] .......................... A45C 13/30; B65D 65/02
(52) U.S. Cl. ........................ 190/26; 150/167; 224/413; 224/430
(58) Field of Search ................................ 150/154, 167; 296/78.1; 224/413, 426, 427, 430; 190/26

(56) References Cited

U.S. PATENT DOCUMENTS

| | | | |
|---|---|---|---|
| 796,286 A | * 8/1905 | Botteese ...................... 190/26 |
| 2,324,495 A | * 7/1943 | Deming .................... 220/592.2 |
| 2,617,504 A | * 11/1952 | Meyers ........................ 190/26 |
| 2,732,046 A | * 1/1956 | Smallberg ................... 190/26 |
| 3,396,885 A | * 8/1968 | Giondi ...................... 224/438 |
| 4,059,207 A | * 11/1977 | Jackson et al. ............ 224/413 |
| 4,096,980 A | 6/1978 | Clow |
| 4,442,960 A | 4/1984 | Vetter |
| 4,480,773 A | 11/1984 | Krauser |
| 4,813,583 A | * 3/1989 | Carpenter ................... 224/428 |
| 5,052,738 A | * 10/1991 | Li ............................ 296/78.1 |
| 5,154,332 A | * 10/1992 | Williams et al. ............ 224/153 |
| 5,350,093 A | * 9/1994 | Sheely ....................... 224/422 |
| 5,662,372 A | * 9/1997 | Lubkeman ............. 296/136.04 |
| 5,762,249 A | 6/1998 | Hann ........................ 224/430 |
| 6,120,083 A | * 9/2000 | Gunther .................... 296/78.1 |
| 6,223,960 B1 | 5/2001 | Powell et al. ............... 224/429 |
| D445,398 S | 7/2001 | Hanagan .................... D12/410 |
| 6,253,978 B1 | 7/2001 | Swenson et al. ............ 224/413 |
| 6,279,796 B1 | * 8/2001 | Trevino ...................... 224/153 |
| D450,632 S | 11/2001 | Morgan ..................... D12/114 |
| 6,315,178 B1 | * 11/2001 | Nobata ....................... 224/153 |
| 6,349,783 B1 | 2/2002 | Galbraith et al. ........... 180/219 |
| 6,378,643 B1 | 4/2002 | Galbraith et al. ........... 180/219 |
| 6,390,220 B1 | 5/2002 | Galbraith et al. ........... 180/219 |
| D465,762 S | 11/2002 | Wargin et al. ............. D12/410 |
| 6,505,765 B1 | * 1/2003 | Proctor et al. .............. 224/413 |
| 6,547,114 B2 | * 4/2003 | Smith ........................ 224/413 |
| 2002/0053583 A1 | * 5/2002 | Aldrich |
| 2003/0201292 A1 | * 10/2003 | Lovett |

FOREIGN PATENT DOCUMENTS

GB        2167656 A    *  6/1986    ........... A45C/11/00

* cited by examiner

Primary Examiner—Sue A. Weaver
(74) Attorney, Agent, or Firm—Kenneth L. Nash

(57) ABSTRACT

The present invention provides a system and method for protecting the luster and finish of a motorcycle saddlebag. In a preferred embodiment, an outer covering is provided that is secured around the motorcycle saddlebag in a manner that the outer covering can be utilized while driving the motorcycle through inclement weather. The outer covering is preferably readily installable and/or removable and may comprise an elastic opening that opens to fit over the saddlebag and then contracts to hold the covering in position. A layer of heat insulation material may-be provided to limit heat damage that may otherwise be caused by extensive sun exposure. An additional retainer such as retainer clips may be utilized for securing the protection apparatus in position, if necessary. The protective covering may comprise one or more pockets or holders, such as map pockets.

20 Claims, 3 Drawing Sheets

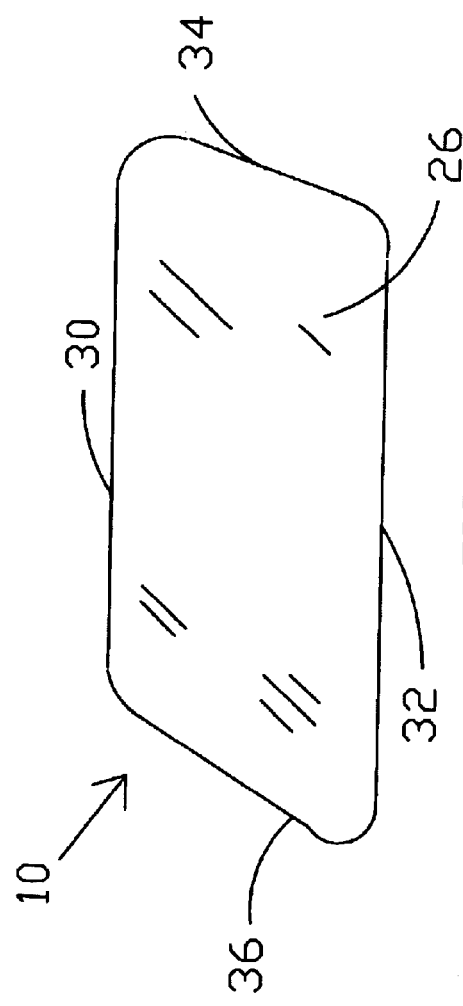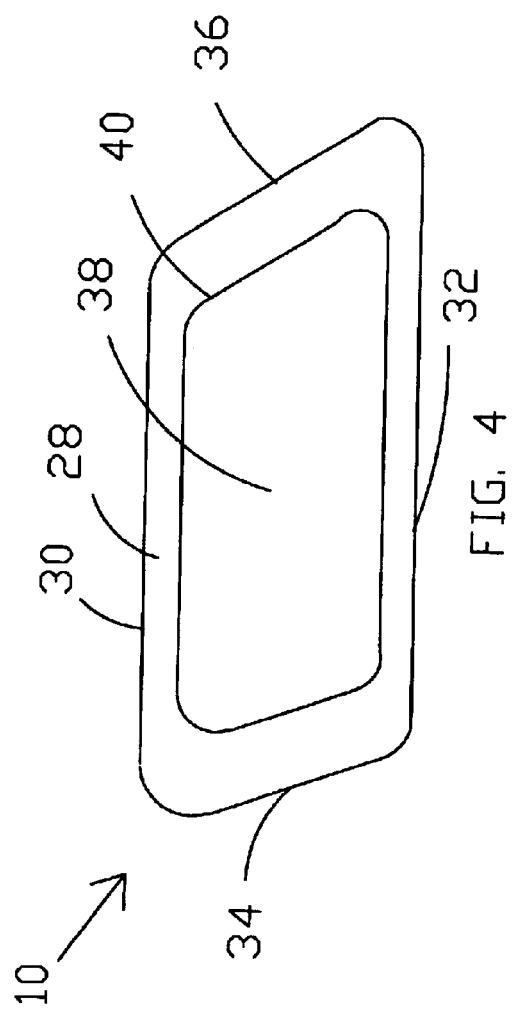
FIG. 3
FIG. 4

MOTORCYCLE SADDLEBAG PROTECTION APPARATUS AND METHOD

TECHNICAL FIELD

The present invention relates generally to motorcycle saddlebags and, more particularly, to apparatus and methods for maintaining, protecting, and preserving the saddlebags and/or the finish thereof.

BACKGROUND ART

Motorcycle saddlebags are quite useful for carrying and storing personal items, baggage, and other goods while traveling by motorcycle. In some cases, motorcycle saddlebags are made of leather and/or other expensive materials. However, in inclement weather or harsh driving conditions, the beautiful materials thereof can be subject to considerable wear and abrasion. When the motorcycle is left outside in the sun, then the saddlebags materials may be exposed to significant heat and ultraviolet radiation. Therefore, motorcycle saddlebags tend to wear faster than is desirable.

While tarpaulins, temporary shelters, and the like, may be utilized to protect the saddlebags when the motorcycle is parked, these types of coverings are bulky and cannot protect the saddlebags while traveling. Thus, prior art coverings are difficult to utilize, bulky to carry, time consuming to install and fold up, and have very limited usefulness in providing any significant protection when the motorcycle is in use, such as while on the road.

Although various patents relating to motorcycle saddlebag innovations are available, these patents do not disclose the present invention.

U.S. Pat. No. D450,632, issued Nov. 20, 2001, to W. F. Morgan, discloses a pair of saddlebag covers.

U.S. Pat. No. 6,223,960, issued May 1, 2001, to Powell et al., discloses a motorcycle saddlebag comprising a body formed of a substantially continuous and substantially rigid material (e.g., plastic) having an opening providing access to the interior volume of the body. A body cover made of a flexible material (e.g., leather) is formed over at least a portion of the exterior surface of the body. The saddlebag further includes a lid formed of a substantially rigid material (e.g., plastic) and a lid cover made of a flexible material (e.g., leather) formed over at least a portion of the exterior surface of the lid. A first fastener and a second fastener are connected in series between the lid and the body such that both the first and second fasteners must be fastened to hold the body to the lid. The first fastener can be a strap and buckle fastener, and the second fastener can be a quick-release fastener that is at least partially hidden by the first fastener. A biasing member is arranged to bias the lid open when the lid is near an open position and to bias the lid closed when the lid is near a closed position.

U.S. Pat. No. D465,762, issued Nov. 19, 2002, to Wargin et al., discloses an ornamental design for a motorcycle saddlebag. U.S. Pat. No. 6,349,783, issued Feb. 26, 2002, to Galbraith et al., discloses a saddlebag mounting system that eliminates the need for external fasteners on the rear fender and corresponding tail section. The saddlebag is mounted to the inner surface of the rear fender using a saddlebag mounting system, including a mounting bracket. The mounting bracket preferably includes an inner bracket coupled to the inner surface of the rear fender, and an outer bracket coupled to the inner bracket, the saddlebag being mounted to the outer bracket. The rear fender can be provided with an inner support mounted to the inner surface to facilitate attachment of the inner bracket. For example, the inner support can include a slotted opening, and a fastener can be used to couple the inner bracket to the inner support. Preferably, the fastener includes a head portion positioned within the slotted opening. The slotted opening can take on a variety of shapes, but preferably includes a wide portion larger than the head portion of the fastener, and a narrow portion smaller than the head portion of the fastener. With this design, the head portion can be inserted into the wide portion and subsequently slid into the narrow portion. Tightening of the fastener to the inner bracket will result in securing the inner bracket to the inner support.

U.S. Pat. No. 6,390,220, issued May 21, 2002, to Galbraith et al., discloses a motorcycle that includes a luggage rack and/or backrest secured to a mounting bracket. The mounting bracket is positioned under the motorcycle seat and is secured to the rear fender of the motorcycle. Attaching the mounting bracket below the motorcycle seat conceals the mounting hardware that is used to secure the mounting bracket to the rear fender. Concealing mounting hardware on a motorcycle enhances the aesthetic appearance of the motorcycle.

The above patents do not disclose solutions for the problems discussed above. Consequently, those parties who appreciate excellent quality saddlebags will sense the importance of the present invention which addresses the above and other long felt but presently unsolved problems.

SUMMARY OF THE INVENTION

An objective of the present invention is to provide a protection apparatus for one or more motorcycle saddlebags.

Another objective of the present invention is a protection apparatus which may be quickly installed and/or removed.

These and other objectives, features, and advantages of the present invention will become apparent from the drawings, the descriptions given herein, and the appended claims. However, it will be understood that the above-listed objectives of the invention are intended only as an aid in understanding aspects of the invention, and are not intended to limit the invention in any way, and therefore do not form a comprehensive or restrictive list of objectives, and/or features, and/or advantages of the invention.

Accordingly, the present invention may comprise an apparatus for protecting a motorcycle saddlebag. The motorcycle saddlebag may comprise at least one container having an outermost side distal from a motorcycle wheel and an innermost side proximate the motorcycle wheel. One possible embodiment of the present invention may comprise one or more elements such as, for instance, an outer protective surface comprised of weather resistant material and sized for fitting around the outermost side of the at least one container. The outer protective surface may further comprise therein a volume having an opening for receiving at least the outermost side of the container therein. A retainer may be utilized to releasably secure the outer protective surface around the outermost side of the container.

In one preferred embodiment, the retainer may further comprises a resilient element such as, for example only, an elastic band adjacent the opening wherein the elastic band at least substantially encircles the opening. Alternatively, or in addition, the retainer may comprise one or more mounting clips, fasteners, or other securing means. If mounting clips are utilized, then the mounting clips may be secured with respect to the container.

In one preferred embodiment, the opening is substantially variable is size whereby the opening may enlarge for encompassing the outermost side of the container and then contract in size, such as by means of an elastic or a draw string, or the like. The volume may be sized to permit the opening to be positioned adjacent the innermost side of the container after the apparatus is attached to the saddlebag. Thus, the substantially variable opening may be reducible or contractible in size after installation to prevent removal from the container.

In another embodiment, a removable cover apparatus is provided that may comprise one or more elements such as, for instance, a housing sized to fit around the saddlebag body, the housing may have a first side defining an opening for receiving the body therein, the housing may be comprised of flexible material, and/or a retainer for securing the housing of the removable cover apparatus to the body saddlebag body.

In operation, a method for the invention may be provided which comprises one or more steps such as, for instance, pulling a covering over the motorcycle saddlebag through an opening in the covering, securing the covering to the motorcycle saddlebag, and/or driving the motorcycle with the covering secured thereto. The method may further comprise driving the motorcycle at highways speeds of at least fifty-five miles per hour. The method may comprise securing comprises reducing a diameter of the opening, and/or providing that the opening comprises an elastic member. In one embodiment, the method may comprise shaping the covering to correspond to a shape of the saddlebag. The method may further comprise removing the covering by pulling the covering off of the saddlebag.

BRIEF DESCRIPTION OF DRAWINGS

For a further understanding of the nature and objects of the present invention, reference should be had to the following detailed description, taken in conjunction with the accompanying drawings, in which like elements may be given the same or analogous reference numbers and wherein:

FIG. 3 is a side elevational view of a motorcycle saddlebag protective apparatus in accord with one embodiment of the present invention;

FIG. 4 is a side elevational view looking into an interior volume of a motorcycle saddlebag protective apparatus in accord with one embodiment of the present invention;

While the present invention will be described in connection with presently preferred embodiments, it will be understood that it is not intended to limit the invention to those embodiments. On the contrary, it is intended to cover all alternatives, modifications, and equivalents included within the spirit of the invention.

GENERAL DESCRIPTION AND PREFERRED MODES FOR CARRYING OUT THE INVENTION

The present invention provides a convenient and easily mountable/removable means for protecting the luster and finish of expensive leather, alligator, and other materials that are sometimes utilized in making high quality motorcycle saddlebags.

Figure 2:
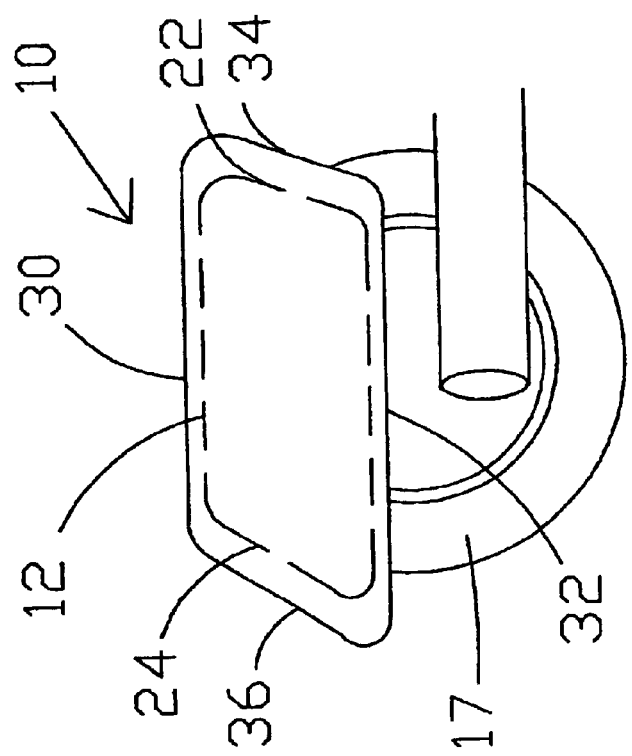
FIG. 2 is an side elevational view, partially in phantom lines, of a motorcycle saddlebag protective apparatus in accord with one embodiment of the present invention.
Figure 1:
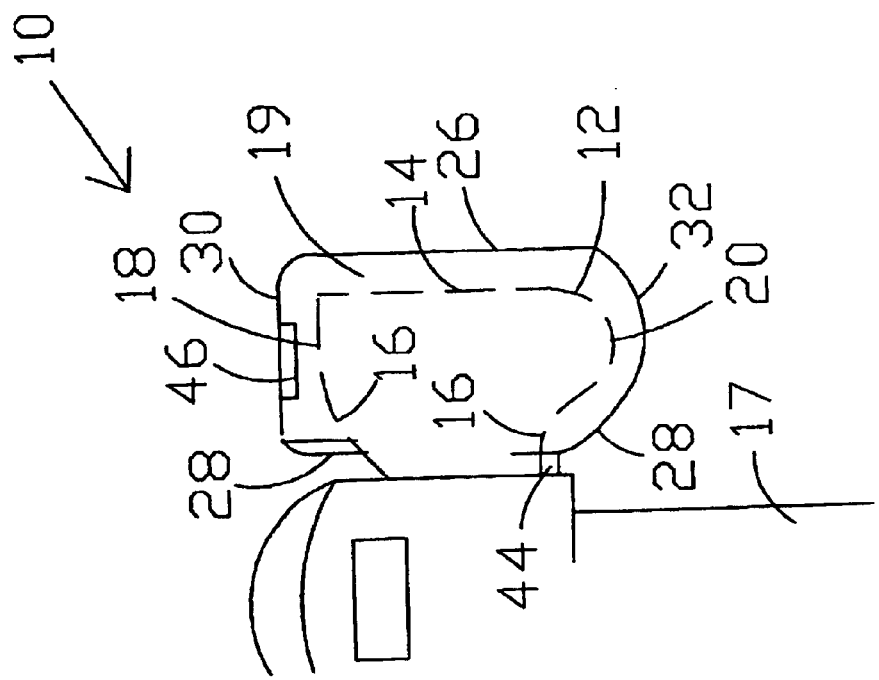
FIG. 1 is an rear elevational view, partially in phantom lines, of a motorcycle saddlebag protective apparatus in accord with one embodiment of the present invention.
Figure 6:
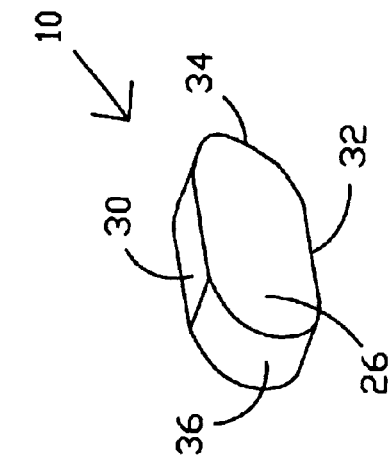
FIG. 6 is a outer side perspective view of a motorcycle saddlebag protective apparatus in accord with one embodiment of the present invention.
Figure 8:
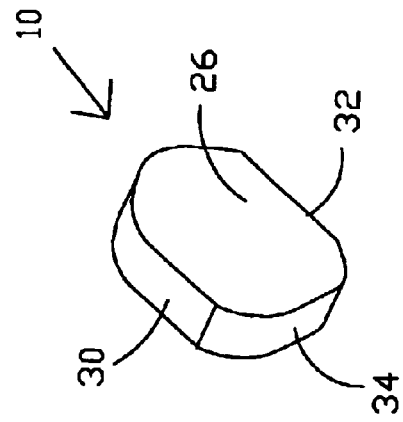
FIG. 8 is an rear side perspective view of a motorcycle saddlebag protective apparatus in accord with one embodiment of the present invention.
Figure 5:
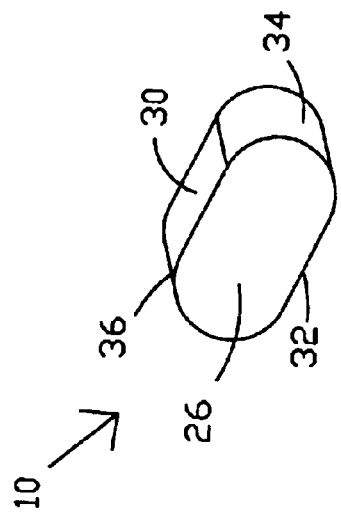
FIG. 5 is a front perspective view of a motorcycle saddlebag protective apparatus in accord with one embodiment of the present invention.
Figure 7:
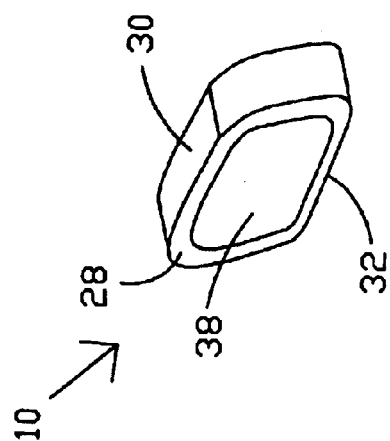
FIG. 7 is an interior side perspective view of a motorcycle saddlebag protective apparatus in accord with one embodiment of the present invention.

Referring now to the drawings, and more particularly to FIG. 1–FIG. 8, there are one or more possible embodiments of protective apparatus 10 in accord with the present invention. FIG. 1 and FIG. 2 show protective apparatus 10 mounted to motorcycle saddlebag 12 in accord with the present invention. Motorcycle saddlebag 12 may be of many different shapes and sizes. Preferably, but not necessarily, protective apparatus 10 is shaped so as to match or at least roughly match the design of the particular motorcycle saddlebag. In a preferred embodiment, it may not be readily apparent that protective apparatus 10 is not the exterior of the motorcycle saddlebag except for the different materials utilized.

Generally, but not necessarily, motorcycle saddlebag 12 will comprise outermost surface 14 which is furthermost or distal to the motorcycle frame or motorcycle wheel 17. As well, motorcycle saddlebag 12 will typically comprise interior wall 16 proximate to the motorcycle frame or motorcycle wheel 17. Motorcycle saddlebag 12 may also comprise top side 18, bottom side 20, front side 22 and rear side 24. The various sides or outer surface of the motorcycle saddlebag forms a saddlebag body inside which is a storage compartment for items to be transported.

When it is desired that protective apparatus 10 be similar in shape to the motorcycle saddlebag as described above, the protective apparatus 10 may also comprise an outer protective surface with various portions such as outermost surface 26, innermost surface 28, top surface 30, bottom surface 32, front surface 34, and rear surface 36 as shown in FIG. 3 and FIG. 4. One or more or all of the surfaces may be substantially combined into one surface. In this example, top surface 30, bottom surface 32, front surface 34, and rear surface 36 may effectively be one substantially cylindrical surface as shown in FIG. 5, FIG. 6, FIG. 7, and FIG. 8.

The outer surfaces 26, 28, 30, 32, 34, and 36 may be comprised of various material such as nylon, Cordura®, or other suitable weatherproof materials. The outer surfaces may have designs, may appear to be a leather or other type of covering, as desired. The surfaces define or form an interior volume that is sized to fit over motorcycle saddlebag 12. The fit between the outer surfaces and motorcycle saddlebag 12 may be tight or, if desired, one or more layers 19 of insulative and/or compressive material such as foam, spandex, or the like may be utilized to further mate protective apparatus 10 to motorcycle saddlebag 12. Insulation material 19 will tend to farther reduce any temperature extremes experienced by saddlebag 12 to thereby further protect the saddlebag. Moreover the compression fit of insulative materials, provides a close fit of protective apparatus 10 and saddlebag 12 and/or tends to eliminate any wrinkles or spaces that might otherwise cause any flapping or movement in wind, even at high speeds. Elastic and the like may also be utilized as part of any surfaces as desired to improve the fit and/or to provide a substantially sturdy and/or tight surface that may be utilized in very high (over one hundred m.p.h.) sustained wind levels or brief pulses of wind as may be encountered on the highway during driving and/or passing oncoming traffic.

The present invention may be secured to motorcycle saddlebag 12 and/or the motorcycle frame in numerous different ways, some of which are discussed herein. However, there are many different types of fasteners, straps, and the like, most of which could be utilized in accord with the present invention after review of this disclosure. Moreover, multiple fasteners and/or different types of fasteners may be used in conjunction with each other. One example of different types of fasteners used in conjunction with each other is discussed hereinafter.

In one presently preferred embodiment, opening 40 (see FIG. 4 and/or FIG. 7) which leads to interior volume 38, is lined, comprised of, and/or constructed with elastic material. Thus, opening 40 preferably stretches to fit over or stretch over saddlebag 12 including outermost wall 14 thereof. Then opening 40 preferably elastically constricts to mate to innermost walls 16 of saddlebag 12 as perhaps best shown in FIG. 1. For many types and shapes of saddlebag 12 the elastic portion of inner wall 28 is entirely sufficient to secure protective apparatus 10 to saddlebag 12 even in very high winds and/or gusts of winds from various directions. However, additional retainer means or alternative retainer means such as clips, hooks, straps, Velcro® strips, and the like may also be utilized. For example mounting clips 44 may be utilized. Mounting clips 44 or a portion thereof may be mounted to the motorcycle frame and/or secured with respect to saddlebag 12 whereby after pulling protective apparatus 10 over saddlebag 12 then mounting clips 44 are secured to thereby secure or further secure protective apparatus 10 with respect to saddlebag 12. Mounting clips 44 may be fasteners, Velcro strips, or the like which can be secured and unsecured conveniently when desired.

Preferably within opening 38, insulative material, or layers thereof, such as foam or the like may be utilized to limit the heat extremes encountered due to the sun. However, the outer surface 26 may itself be comprised of sufficient thickness and/or insulation material, if desired.

Preferably protective apparatus 10 is substantially flexible so as to be compressible and easily storable when not in use. Protective apparatus may further comprise one or more map pockets 46, as shown in FIG. 1, and/or other pockets, openings, zippers or the like as desired. Pocket 46 may preferably utilize a VELCRO® closure for securely sealing the pocket, but could also utilize elastic closure, zipper, buttons, or the like for this purpose. Thus, for frequently needed items, one or more pockets 46 may be utilized to hold such items to be readily available when traveling. However, removal of protective apparatus 10 is also quickly accomplished and therefore does not significantly interfere with obtaining access to the contents of saddlebag 12 whenever desired.

Thus, in operation, protective apparatus 10 is mounted to each saddlebag 12 to protect the materials of which saddlebag 12 is comprised. In one presently preferred embodiment, opening 40 stretches to permit protective apparatus 10 to be conveniently slipped over saddlebag 12. Opening 40 then constricts or contracts adjacent saddlebag 12 innermost side 16 to thereby secure protective apparatus 10 thereto.

The foregoing disclosure and description of the invention is therefore illustrative and explanatory of a presently preferred embodiment of the invention and variations thereof, and it will be appreciated by those skilled in the art, that various changes in the design, manufacture, layout, organization, order of operation, means of operation, equipment structures and location, methodology, the use of mechanical equivalents, as well as in the details of the illustrated construction or combinations of features of the various elements may be made without departing from the spirit of the invention. As well, the drawings are intended to describe the concepts of the invention so that the presently preferred embodiments of the invention will be plainly disclosed to one of skill in the art but are not intended to be manufacturing level drawings or renditions of final products and may include simplified conceptual views. Thus, various changes and alternatives may be used that are contained within the spirit of the invention. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative of a presently preferred embodiment and not in a limiting sense.

What is claimed is:

1. An apparatus for protecting a motorcycle saddlebag, said motorcycle saddlebag comprising at least one container having an outermost side distal from a motorcycle wheel and an innermost side proximate said motorcycle wheel, said apparatus comprising:

an outer protective surface comprising weather resistant material, said outer protective surface being sized for fitting tightly around said outermost side and at least a portion of said innermost side of said at least one container with a sufficiently tight fit to resist flapping in the wind of said outer protective surface even at highway speeds, said outer protective surface comprising therein a volume which is similarly sized to fit closely with said container, said volume having an opening for receiving said outermost side of said container therein, and a retainer for releasably securing said outer protective surface around said outermost side of said container.

2. The apparatus of claim 1 wherein said retainer further comprises a resilient element.

3. The apparatus of claim 1 wherein said retainer comprises an elastic band adjacent said opening.

4. The apparatus of claim 3 further comprising a layer of heat insulation material, said heat insulation material being comprised of compressive material to thereby aid in providing said sufficiently tight fit to resist flapping in the wind.

5. The apparatus of claim 1, wherein said retainer comprises one or more mounting clips.

6. The apparatus of claim 5, wherein said mounting clips are secured with respect to said container.

7. The apparatus of claim 1, wherein said opening is substantially variable in size whereby said opening for encompassing said outermost side of said container, said volume being sized to permit said opening to be positioned adjacent said innermost side of said container.

8. The apparatus of claim 7 wherein said substantially variable opening is reducible in size after installation to prevent removal from said container.

9. The apparatus of claim 8, wherein said outer protective surface is comprised of heat insulative material sufficient for preventing temperature extremes of said saddlebag due to sun exposure.

10. A removable cover apparatus for a motorcycle saddlebag, said motorcycle saddle bag comprising a body defining an interior storage space, said removable cover apparatus comprising:

a housing sized to fit around said body, said housing having a first side defining an opening for receiving said body therein, said housing comprised of flexible material, said flexible material defining an interior shaped to mate with said body and fitting sufficiently tightly to said body to resist formation of wrinkles in said flexible material even at highway speeds; and a retainer for securing said housing to said body.

11. The removable cover of claim 10, wherein said retainer comprises an elastic band adjacent said opening.

12. The removable cover of claim 10, wherein said retainer comprises one or more mounting clips, said mounting clips being affixed with respect to said body.

13. The removable cover of claim 10 further comprising a layer of insulation material, said insulation material being comprised of compressive material to thereby aid in tightening said flexible material with respect to said body for resisting formation of wrinkles in said flexible material even at highway speeds.

14. The removable cover of claim 10 further comprising a pocket in said housing.

15. A method for protecting a motorcycle saddlebag mounted to a motorcycle, comprising;

pulling a cover over said motorcycle saddlebag through an opening in said covering to provide a close fit between said cover and said motorcycle saddlebag, said cover when installed covering an outer side of said motorcycle saddlebag and at least a substantial portion of an inner side of said motorcycle saddlebag;

securing said covering to said motorcycle saddlebag; and driving said motorcycle with said covering secured thereto, said covering fitting sufficiently tightly to said body to resist formation of wrinkles or flapping of said covering in said flexible material even at highway speeds.

16. The method of claim 15, wherein said driving further comprises driving said motorcycle at highway speeds of at least fifty-five miles per hour.

17. The method of claim 15, further comprising providing a layer of heat insulation material to protect said saddlebag from heat damage.

18. The method of claim 15, further comprising providing that said opening comprises an elastic member.

19. The method of claim 15, further comprising shaping said covering to correspond to a shape of said saddlebag.

20. The method of claim 15, further comprising removing said covering by pulling said covering off of said saddlebag.

* * * * *